United States Patent [19]

Aiyama et al.

[11] Patent Number: 4,898,039
[45] Date of Patent: * Feb. 6, 1990

[54] THROTTLE LEVER HOLDING DEVICE

[75] Inventors: Fumihiko Aiyama, Musashimurayama; Koji Hirayama, Ome, both of Japan

[73] Assignee: Kioritz Corporation, Tokyo, Japan

[*] Notice: The portion of the term of this patent subsequent to Oct. 24, 2006 has been disclaimed.

[21] Appl. No.: 119,927

[22] Filed: Nov. 13, 1987

[30] Foreign Application Priority Data

Nov. 14, 1986 [JP] Japan .......................... 61-174888[U]

[51] Int. Cl.$^4$ ............................................ F02M 17/34
[52] U.S. Cl. ............................................ 74/6; 30/216; 30/382; 123/396; 192/131 R
[58] Field of Search ................ 30/216, 228, 233, 241, 30/286, 381, 382; 56/10.5, 10.8; 123/395, 396, 398, 400, 179 SE, 179 G; 192/131 R; 74/6

[56] References Cited

U.S. PATENT DOCUMENTS

| 3,131,277 | 4/1964 | Brenzem | 30/382 |
|---|---|---|---|
| 3,314,405 | 4/1967 | Irgens | 123/376 |
| 3,361,165 | 1/1968 | Irgens | 30/381 |
| 3,774,303 | 11/1973 | Burkett et al. | 30/382 |
| 4,090,345 | 5/1978 | Harkness | 56/10.5 |
| 4,302,880 | 12/1981 | Elfving et al. | 123/179 G |
| 4,378,637 | 4/1983 | Kieser et al. | 30/382 |
| 4,406,066 | 9/1983 | Itzrodt | 30/382 |
| 4,543,723 | 10/1985 | Bortfeld et al. | 30/382 |

FOREIGN PATENT DOCUMENTS

| 1295914 | 5/1969 | Fed. Rep. of Germany . |
| 3019977 | 12/1980 | Fed. Rep. of Germany ...... 123/398 |
| 3007110 | 9/1981 | Fed. Rep. of Germany ........ 30/216 |
| 3308400 | 9/1983 | Fed. Rep. of Germany . |
| 3343772 | 6/1985 | Fed. Rep. of Germany . |
| 2558567 | 7/1985 | France . |

OTHER PUBLICATIONS

"16 Latch, Toggle and Trigger Devices", Sigmund Rappaport, *Mechanisms, Linkages, and Mechanical Controls,* ©1965.

Primary Examiner—Leslie A. Braun
Assistant Examiner—Scott Anchell
Attorney, Agent, or Firm—Browdy & Neimark

[57] ABSTRACT

A throttle lever holding mechanism is disclosed in which an intermediate locking member is provided for at least one of first and second throttle levers. The throttle lever is moved in an operational direction so that the throttle lever is kept under a predetermined operational condition by the intermediate locking member. The throttle lever is further moved in the operational direction so that the locking of the throttle lever by the intermediate locking member is released.

2 Claims, 6 Drawing Sheets

THROTTLE LEVER HOLDING DEVICE

BACKGROUND OF THE INVENTION

1. Field of the Invention

The present invention relates to a throttle safety device of such type that a throttle lever adjustment may be attained only by combining operational actions of two throttle levers.

2. Description of the Prior Art

A throttle safety mechanism is adapted in view of the safety aspect in order to avoid a possible danger for engine drive control, in particular, for controlling a handy type working machine such as engine-driven type hedge trimmer or the like. There has been provided a throttle safety mechanism wherein throttle levers are operable only in the case where the two independent or discrete throttle levers are manipulated together. In the working machine provided with such a throttle safety mechanism, when the operator's hand is released away from either one of the throttle levers due to some reason so that either one of the throttle levers is returned back to its initial position, the throttle valve will be automatically closed to return the engine to the idle speed condition.

Accordingly, it would be difficult to well start the working machine provided with such a safety mechanism. In particular, in the case of the idle start failure, the working machine suffers from a disadvantage that it would be impossible to perform the engine starting operation with a recoil starter or the like by one operator.

SUMMARY OF THE INVENTION

An object of the present invention is to provide a throttle lever holding mechanism in which an intermediate locking means is provided for at least one throttle lever to thereby overcome the disadvantage inherent in the prior art working machine.

In order to attain this or other objects, according to the present invention, in such a throttle device that the engine rpm may be increased only in the case where first and second throttle levers are simultaneously operated by both hands, there is provided a throttle lever holding mechanism characterized in that an intermediate locking means is provided for at least one of the first and second throttle levers, the throttle lever being moved in an operational direction so that the throttle lever is kept under a predetermined operational condition by the intermediate locking means, and the throttle lever being further moved in the operational direction so that the locking of the throttle lever by the intermediate locking means is released.

Therefore, in the throttle lever holding mechanism according to the invention, if during the engine starting operation, one of the throttle levers is kept under the operable condition and the intermediate locking means is held at a predetermined position, it is possible to readily start the engine by opening the throttle valve only with the operation for the other throttle lever. If the locked throttle lever is further moved in the operational condition, the intermediate locking means is released to serve as the throttle safety mechanism.

As described above, in the throttle lever holding device according to the invention, the intermediate locking means is provided for at least one of the throttle levers to enable one of the throttle lever to be kept under the operational condition. Therefore, is it possible to facilitate the engine starting operation of the working machine provided with a throttle safety mechanism in which the throttle adjustment is possible only by the combination of the operational actions of the two throttle levers.

DESCRIPTION OF THE PREFERRED EMBODIMENTS

The present invention will now be described with reference to the accompanying drawings.

Figure 1:
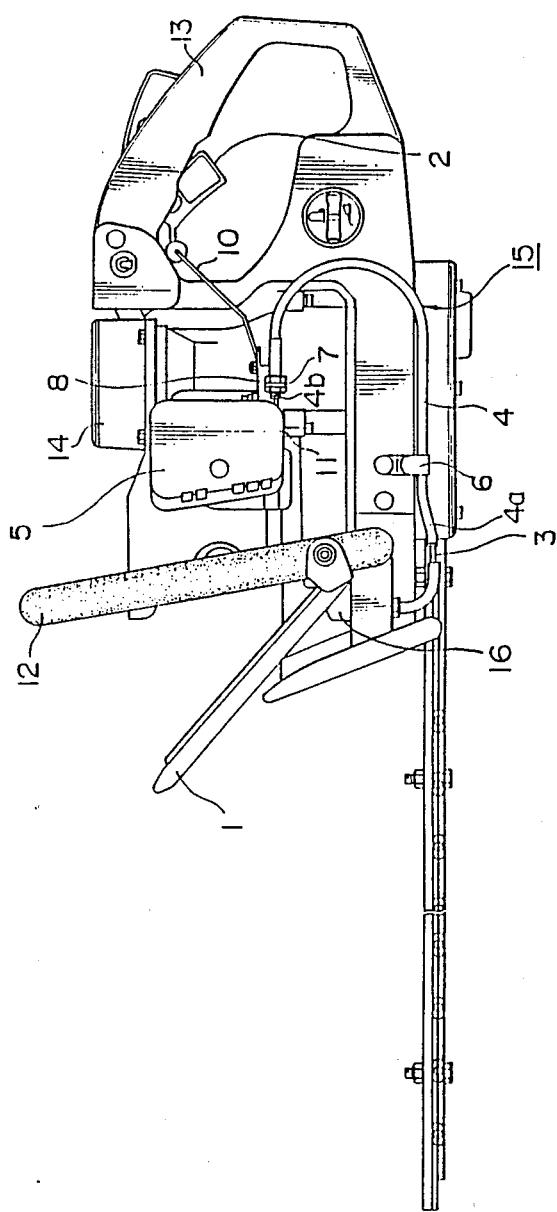
FIG. 1 is a front elevational view showing one embodiment of a hedge trimmer provided with a throttle lever holding device according to the present invention.
Figure 2:
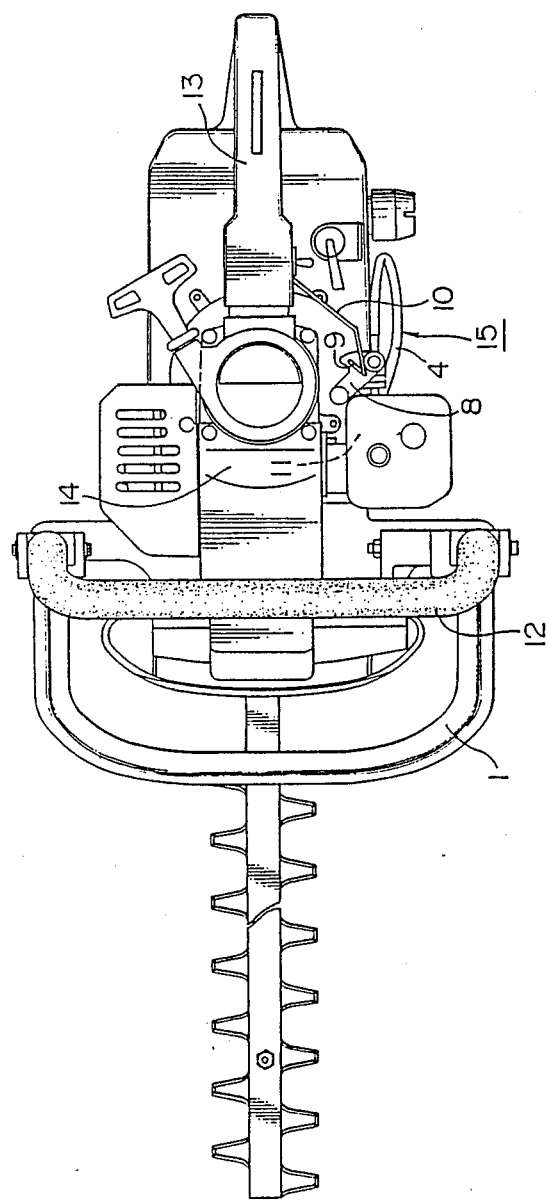
FIG. 2 is a plan view of the hedge trimmer shown in FIG. 1.

FIGS. 1 and 2 show an engine-drive type hedge trimmer provided with a throttle safety mechanism having a throttle lever holding mechanism according to the present invention.

Figure 3:
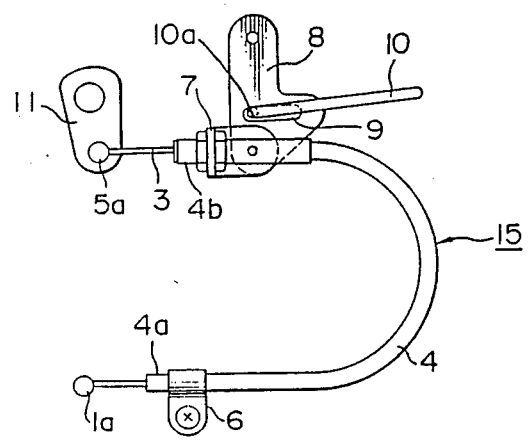
FIGS. 3 through 7 are schematic views showing operation of a throttle safety mechanism.

The throttle safety mechanism comprises a drive means composed of a few of parts and a throttle cable 15 arranged in a curved manner. The throttle cable 15 is composed of a wire cable 3 and an outer tube or sheath 4 covering the wire cable 3. As shown in FIG. 3, the wire cable 3 is connected at one end 5a to a throttle valve opening/closing member 11 of a carburetor 5 of the engine 14 and at the other end 1a to a first throttle lever 1 pivotally coupled to a front handle 12. The outer tube 4 covering the wire cable 3 is fixedly secured at one end 4a to the machine body by a fastening means 6. The other end 4b of the outer tube 4 is freely slidable on the wire cable 3 in conformity with a curvature deformation of the wire cable 3.

An L-shaped bracket 7 is fixed to the freely movable other end 4b of the outer tube 4. Further, the L-shaped bracket 7 is coupled by pin means to a link member 8 which in turn is swingably held to the machine body. Namely, the link member 8 and the freely movable other end 4b of the outer tube 4 are coupled to each other in such a manner that these members may be each moved linearly and angularly.

An elongated slot 9 is formed in the link member 8. An end 10a of a connecting rod 10 which is moved in cooperation with a second throttle lever 2 is slidably moved within the elongated slot 9. In the embodiment shown, the end 10a of the connecting rod 10 which is slidably moved within the slot 9 is bent so as to be engagable with an end of the elongated slot 9.

FIG. 3 is an illustration showing a primary part of the throttle lever mechanism in the case where the operator does not hold the machine body but the engine is operated at an idle speed.

Figure 4:
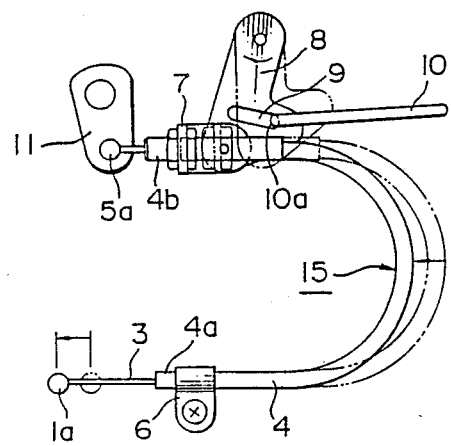

With such arrangement, when the operator grips a front handle 12 by his hand while pulling the first lever 1, the other end of the wire cable 3 is moved leftwardly as shown in FIG. 4. At this time, since the one end 4a of the outer tube 4 is held by the fastening means 6, a part of the curved throttle cable 15 is deformed to the condition as indicated by solid lines in FIG. 4. As the throttle cable 15 is deformed, the other end 4b of the outer tube 4 is moved leftwardly while sliding on the wire cable 3. In compliance with this deformation, the link member 8 is also moved leftwardly. The deformation or displacement of the throttle cable 15 and the link member 8 is finally shown in FIG. 4.

Although the movement of the components by the operation of the first lever 1 has been described above, it should be noted that the throttle valve opening/closing member 11 for the carbretor 5 and the one end 5a of the wire cable 3 are kept unchanged in constant positions under the engine idle condition. The reason for this is that the deformation of the wire cable 15 caused by the operation of the first throttle lever 1 is absorbed by the rigidity and the deformation of the outer tube 4.

Figure 5:
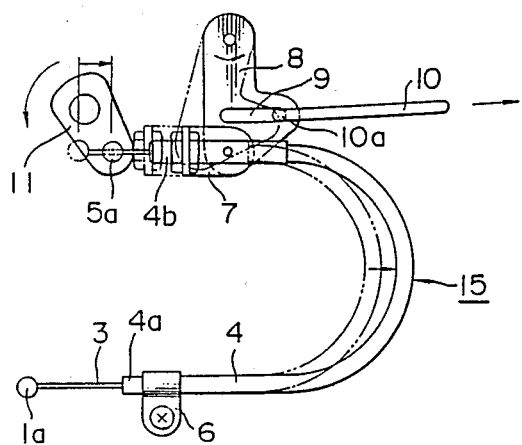

Under such a condition, when a rear handle 13 is gripped by the other hand to pull the second throttle lever 2 so that the connecting rod 10 is pulled in the right in FIG. 5, the bent end 10a of the connecting rod 10 is brought into contact with a right end of the elongated slot 9 to return to the right the link member 8 which has been swung to the left. As a result, the outer tube 4 having rigidity is returned to the original position indicated by solid lines in FIG. 5. Since the other end 1a of the wire cable 3 is kept at the constant position by the first lever 1, the end 5a is moved to the right as indicated by the solid line, so that the throttle valve opening/closing member 11 is moved, thus adjusting the throttle.

In contrast to the above-described operation, when either one of the first and second throttle levers 1 and 2 is released from the operator's hand, the one end 5a of the wire cable 3 is returned back to the position shown by the solid line in FIG. 4 and the opening/closing member 11 is also returned back to the original or home position, so that the engine is returned back to the idling condition.

Figure 6:
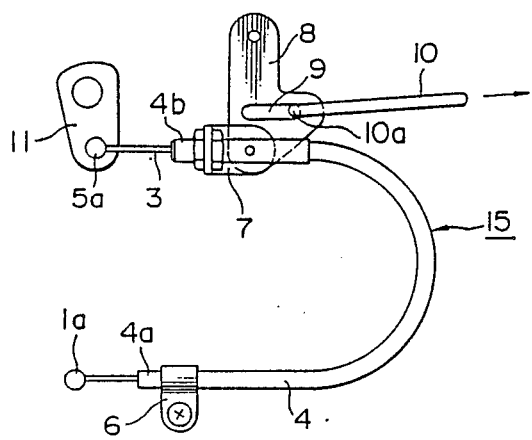

FIG. 6 shows the case where the throttle operation is commenced by the second lever 2 unlike the case shown in FIG. 4. Even if the second lever 2 is solely pulled, the end 10a of the connecting rod 10 is simply moved rightwardly along the elongated slot 9 of the link member 8 but there is no deformation of the throttle cable 15. Under this condition, when the first lever 1 is also pulled as shown in FIG. 7 to move the other end 1a of the wire cable 3 leftwardly, since the connecting rod 10 serves to prevent the leftward movement of the other end 4b of the outer tube 4 through the link member 8, the one end 5a of the wire cable 3 is moved rightwardly to move the opening/closing member 11 and to perform the corresponding throttle adjustment.

Figure 7:
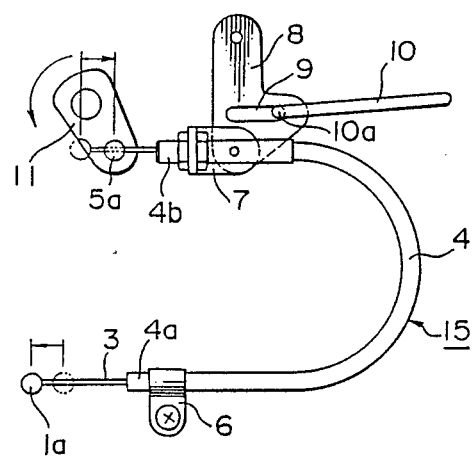

In the same manner as in the operational order explained in conjunction with FIGS. 4 and 5, when the operator's hand separates away from either one of the first and second throttle levers in the case of FIGS. 6 and 7, the one end 5a of the wire cable 3 is returned back to the solid position in FIG. 6, so that the engine is returned back to the original idling condition.

Figure 8:
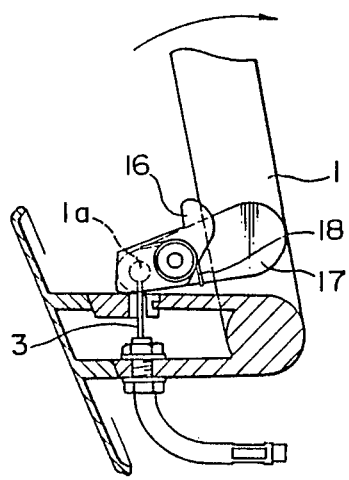
FIGS. 8 and 9 are partial views for illustrating an intermediate locking member of the throttle lever holding mechanism according to one embodiment of the present invention.
Figure 9:
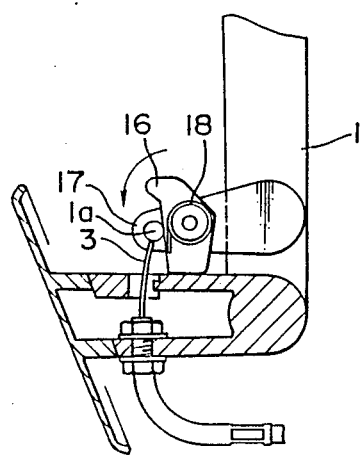

FIG. 8 shows an example of the throttle lever holding mechanism according to the invention. An intermediate locking member 16 is angularly urged clockwise about a wire cable mounting portion 17 of the first throttle lever 1 through a tortion spring 18. In the case where during the engine starting state, the intermediate locking member 16 is operated, the first throttle lever 1 is moved in its operational direction, i.e., in the clockwise direction in FIG. 8. When the intermediate locking member 16 is rotated counterclockwise, the intermediate locking member 16 is locked under the condition shown in FIG. 9, and the first throttle lever 1 is kept under a predetermined operational condition. Accordingly, it is possible to start the engine by gripping the second throttle lever 2 by the operator's one hand to open the throttle valve and operating a recoil starter or the like by the other hand. In the case where the work is started after the engine has been started, the first throttle lever 1 is further rotated clockwise by one hand, the intermediate locking member 16 is rotated clockwise by the action of the spring 18 to release the locking of the intermediate locking member 16, so that the first throttle lever 1 is brought into the normal condition, thus constituting a throttle safety mechanism together with the second throttle lever 2.

What is claimed is:

1. A throttle lever mechanism comprising:
   first and second throttle levers;
   a throttle valve opening/closing member for a carburetor;
   a pivotable mounted link member having an elongated slot;
   a connecting rod connected at one end to the second throttle lever and at another end to the link member through the elongated slot;
   cable means having an inner wire cable and an outer tube covering the inner wire cable, a first end of the inner wire cable being connected to the first throttle lever, a second end of the inner wire cable being connected to the throttle valve opening/closing member, a first end of the outer tube being held in a stationary manner, and a second end of the outer tube being connected to said link member; and
   an intermediate locking means provided for at least one of the first and second throttle levers for locking the at least one lever in a predetermined operational condition,
   wherein when the at least one throttle lever is moved in an operational direction for a first time, the at least one lever is locked in the predetermined operational condition by the intermediate locking means and when the at least one throttle lever is moved in the operational direction a second time, the at least one throttle lever is released from the predetermined operation condition.

2. A throttle lever mechanism according to claim 1, further comprising a wire cable mounting portion connected between the first end of the inner wire cable and the first throttle lever and wherein the intermediate locking means is rotatably connected to the wire cable mounting portion and the locking means includes a spring for biasing the locking means.

* * * * *